(12) United States Patent
Lee

(10) Patent No.: US 12,263,538 B2
(45) Date of Patent: Apr. 1, 2025

(54) CONNECTOR AND LASER ENGRAVING LABEL FORMING METHOD THEREOF

(71) Applicant: James Cheng Lee, La Habra, CA (US)

(72) Inventor: James Cheng Lee, La Habra, CA (US)

( * ) Notice: Subject to any disclaimer, the term of this patent is extended or adjusted under 35 U.S.C. 154(b) by 756 days.

(21) Appl. No.: 17/532,719

(22) Filed: Nov. 22, 2021

(65) Prior Publication Data

US 2022/0184742 A1 Jun. 16, 2022

Related U.S. Application Data

(60) Provisional application No. 63/125,428, filed on Dec. 15, 2020.

(30) Foreign Application Priority Data

Nov. 4, 2021 (CN) .......................... 202111298576.7

(51) Int. Cl.
  *B23K 26/359* (2014.01)
  *B23K 37/04* (2006.01)
  *B23K 101/36* (2006.01)
  *G06K 7/14* (2006.01)

(52) U.S. Cl.
  CPC ........ *B23K 26/359* (2015.10); *B23K 37/0443* (2013.01); *G06K 7/1413* (2013.01); *B23K 2101/36* (2018.08)

(58) Field of Classification Search
  CPC .............. B23K 26/359; B23K 37/0443; B23K 2101/36; B23K 26/355; G06K 7/1413; G06K 1/126; G06K 1/128; G06K 19/06159; B44B 3/009; B44B 3/02
  See application file for complete search history.

(56) References Cited

U.S. PATENT DOCUMENTS

2019/0184502 A1\* 6/2019 Kim ..................... B23K 26/244

FOREIGN PATENT DOCUMENTS

CN 105678362 A \* 6/2016
CN 211661340 U \* 10/2020

OTHER PUBLICATIONS

Trotec Laser Canada; YouTube video: https://www.youtube.com/watch?v=OOa5AK38wmA; Laser Engraving USB Flash Drives / Laser Engraved USB Sticks; Feb. 28, 2019; 6 pages. (Year: 2019).\*

\* cited by examiner

*Primary Examiner* — John P. Dulka

(57) ABSTRACT

A connector and labeling forming method thereof is provided. The method includes: a laser engraving device generating a laser beam, and controlling the laser beam to engrave a label on a labeling part of a metal shell of a connector. The connector includes a metal shell and a label. The metal shell has a labeling part and the label is engraved on the labeling part by a laser beam. As such, the invention can engrave the label on the labeling part of the metal shell of the connector by using the laser engraving technology to replace the traditional self-adhesive label, thereby being able to solve all the problems caused by the self-adhesive label.

4 Claims, 17 Drawing Sheets

CONNECTOR AND LASER ENGRAVING LABEL FORMING METHOD THEREOF

BACKGROUND OF THE INVENTION

1. Field of the Invention

The present invention relates generally to a connector and a label forming method thereof, and more particularly, to a connector having a label formed by laser engraving technology and a method for forming a label on the connector by laser engraving technology.

2. The Prior Arts

Generally, self-adhesive labels are affixed to the labeling parts of the housing of electronic products. The self-adhesive label includes a substrate, an adhesive and a release paper. The material of the substrate can be coated paper, thermal-sensitive paper, polyethylene terephthalate (PET), polyvinyl chloride (PVC), etc. and a general printing technology is used to print the relevant text and patterns of product information on the front side of the substrate. Product information includes trademark, product name, model number, serial number, QR code, origin, manufacturing year, manufacturing number, safety certification, etc. The release paper is adhered to the back of the substrate with an adhesive. After the release paper is torn off from the back of the substrate, the substrate is manually attached to the labeling part with an adhesive.

However, the product information is the characters and patterns formed after the printing ink dries, which may be easily peeled off, smearing after rubbing, and not easy to identify, so that the barcode scanner may fail to scan the serial number barcode.

Furthermore, printing inks are prone to causing allergic reactions in the human.

In addition, common adhesives include oil-soluble adhesives, water-soluble adhesives and hot melt adhesives. The oil-soluble adhesives need to be dissolved in organic solvents, so the manufacturing cost is relatively high; moreover, organic solvents are volatile and toxic, which are obviously harmful to the human. The water-soluble adhesives have low viscosity and low transparency. The hot melt adhesive coating equipment is relatively expensive, and the hot melt adhesive has poor gas resistance, light resistance, and weather resistance, and the retention effect is poor.

In addition, traditional printing technology is difficult to print small, high-precision and high-complexity text and patterns, and self-adhesive labels need to manually tear off the release paper and manually attach the substrate of the self-adhesive labeling to the labeling part, which cannot be executed in a mass production and rapid manner.

It is worth mentioning that it is not easy for users to manually align the substrate with the labeling part, which often causes the substrate to exceed the boundary of the labeling part. Some electronic products are connectors, such as small form-factor pluggable (SFP) transceiver, quad small form-factor pluggable (QSFP) transceiver, or eight-channel small form-factor pluggable (OSFP) transceiver, and are plugged into and unplugged from a socket of a server. However, during the process of plugging and unplugging the connector, the substrate beyond the border of the labeling part will squeeze against a conductive shrapnel of electromagnetic interference (EMI) prevention of the server socket, resulting in damage to the conductive shrapnel. Moreover, in the process of unplugging the connector, the substrate beyond the boundary of the labeling part will cause the connector to be stuck in the socket of the server, making it difficult to unplug the connector from the socket of the server.

SUMMARY OF THE INVENTION

A primary objective of the present invention is to provide a connector and a label forming method thereof, which can engrave a label on a labeling part of the metal shell of the connector by laser engraving technology, so as to solve the problems of self-adhesive labels.

In order to achieve the foregoing objective, the present invention provides a connector label forming method, including the following steps: a laser engraving device generating a laser beam, and controlling the laser beam to engrave a label on a labeling part of a metal shell of a connector.

In a preferred embodiment, before the step of engraving the label, the following step is further included: setting the connector in the laser engraving device; and, after the step of engraving the label, the following step is further included: removing the connector from the laser engraving device.

In a preferred embodiment, the step of setting the connector in the laser engraving device further includes the following steps: inspecting whether the appearance of the connector meets the standard; when the appearance of the connector meets the standard, lifting a cover of a laser jig, and setting the connector in a positioning groove of the laser jig; covering the cover of the laser jig to fix the connector, and the labeling part being exposed through a hollow part of the cover; and, placing the laser jig in the laser engraving device; wherein, the step of engraving the label further includes the following steps: the laser beam passing through the hollow part of the cover to engrave the label on the labeling part.

In a preferred embodiment, the step of removing the connector from the laser engraving device further includes the following steps: removing the laser jig from the laser engraving device; and, lifting the cover of the laser jig and removing the connector from the positioning groove.

In a preferred embodiment, after the step of removing the connector, the following step is further included: inspecting whether the label conforms to the standard.

In a preferred embodiment, the step of engraving the label further includes the following steps: opening a laser universal product code program, and selecting a specific laser engraving program from the laser universal product code program; scanning a serial number barcode with a code scanner; confirming whether the serial number barcode is correct; after confirming that the serial number barcode is correct, starting the laser engraving device; the laser engraving device generating a laser beam according to the selected specific laser engraving program, and controlling the laser beam to engrave the label on the labeling part.

In a preferred embodiment, the step of engraving the label further includes the following steps: the laser engraving device controlling the laser beam to engrave the label on a metal surface or a transfer paint surface of the labeling portion.

In a preferred embodiment, the connector is a small form-factor pluggable transceiver, a quad small form-factor pluggable transceiver, or an octal small form-factor pluggable transceiver.

In order to achieve the foregoing objective, the present invention provides a connector, including a metal shell and a label, the metal shell having a labeling part, and the label being engraved on the labeling part by a laser beam.

In a preferred embodiment, the labeling portion has a metal surface or a transfer paint surface, and the label is engraved on the metal surface or transfer paint surface of the labeling portion by a laser beam.

The effect of the present invention is that the present invention can use laser engraving technology to engrave the label on the labeling part of the metal shell of the connector, instead of the traditional self-adhesive label, so as to solve all the problems caused by the self-adhesive label.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
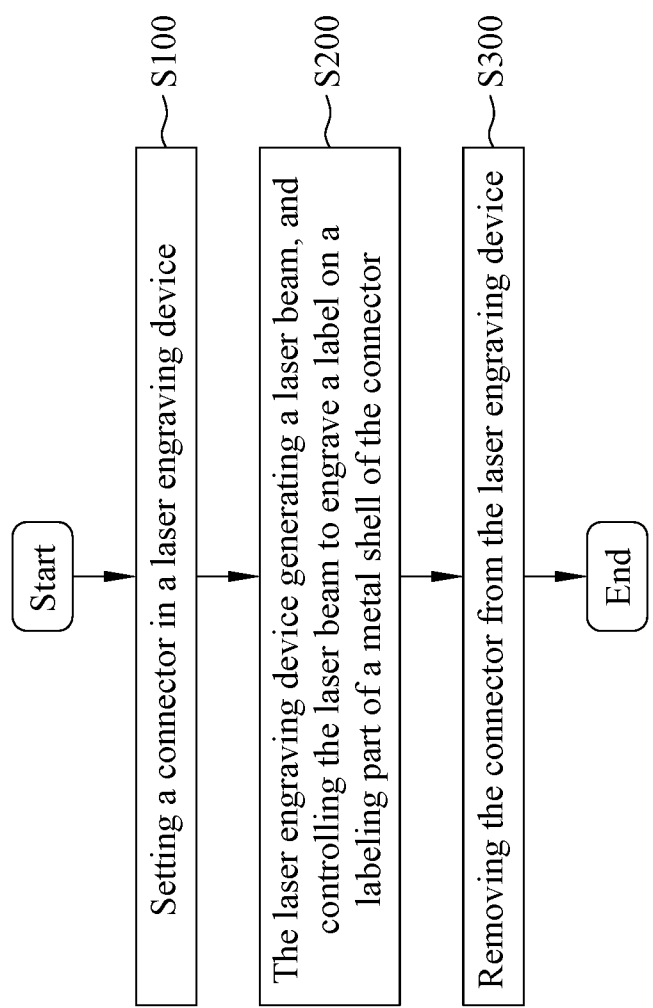
FIG. 1 is a flowchart of the label forming method of the connector of the present invention.

Referring to FIG. 1, FIG. 1 is a flowchart of the label forming method of the connector of the present invention. As shown in FIG. 1, the present invention provides a connector label forming method, which includes the following steps: step S100, setting a connector 10 in a laser engraving device 20; step S200, the laser engraving device 20 generating a laser beam 21, and controlling the laser beam 21 to engrave a label 12 on a labeling part 111 of a metal shell 11 of the connector 10; and, in step S300, removing the connector 10 from the laser engraving device 20.

Figure 2:
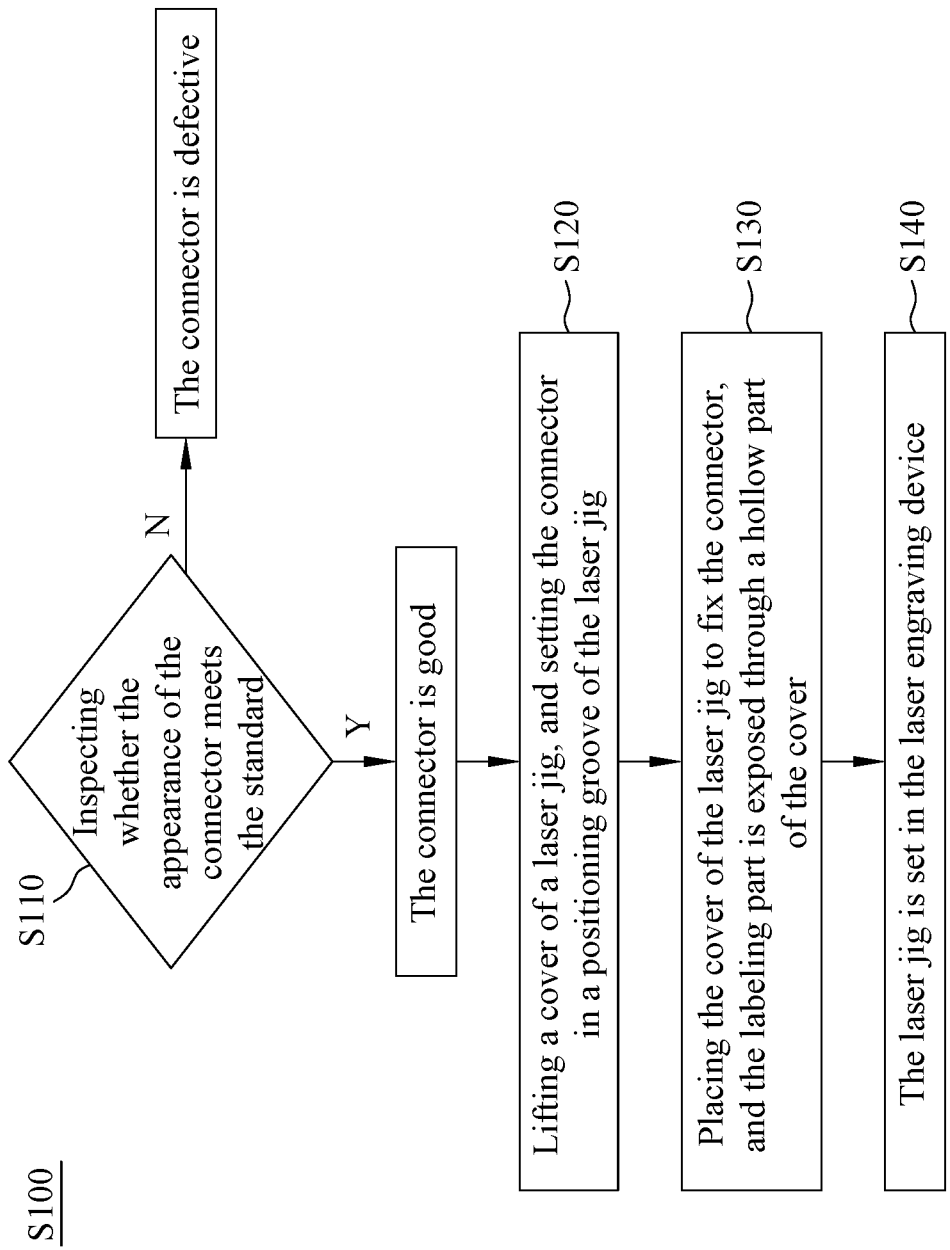
FIG. 2 is a flowchart of step S100 of the label forming method of the connector of the present invention.
Figure 3:
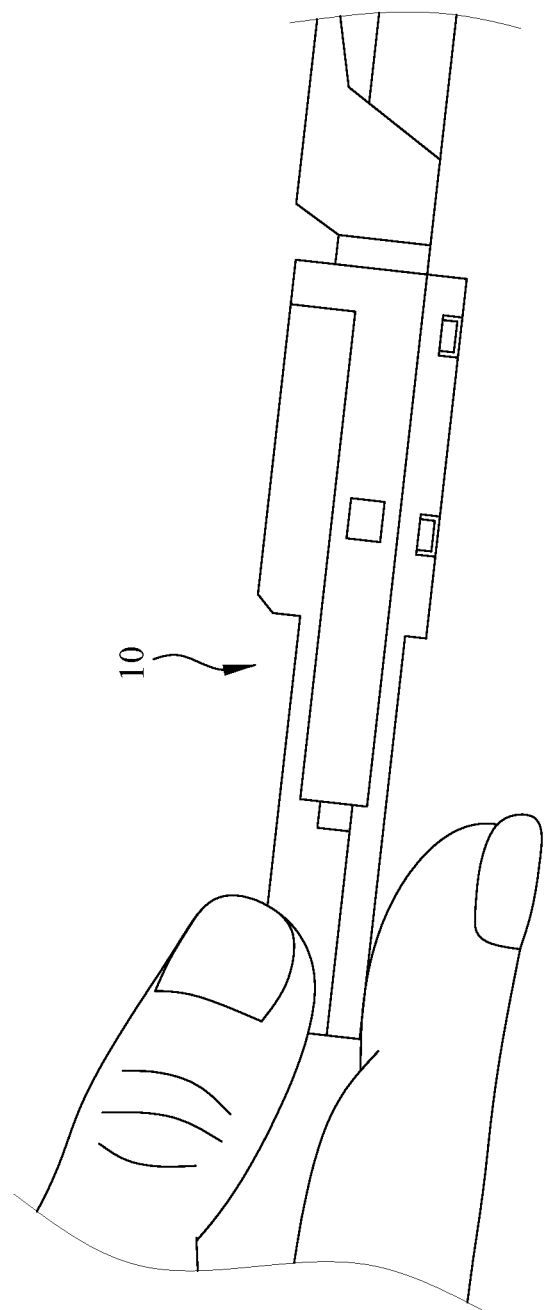
FIG. 3 shows a schematic view of inspecting the appearance of the connector.
Figure 4:
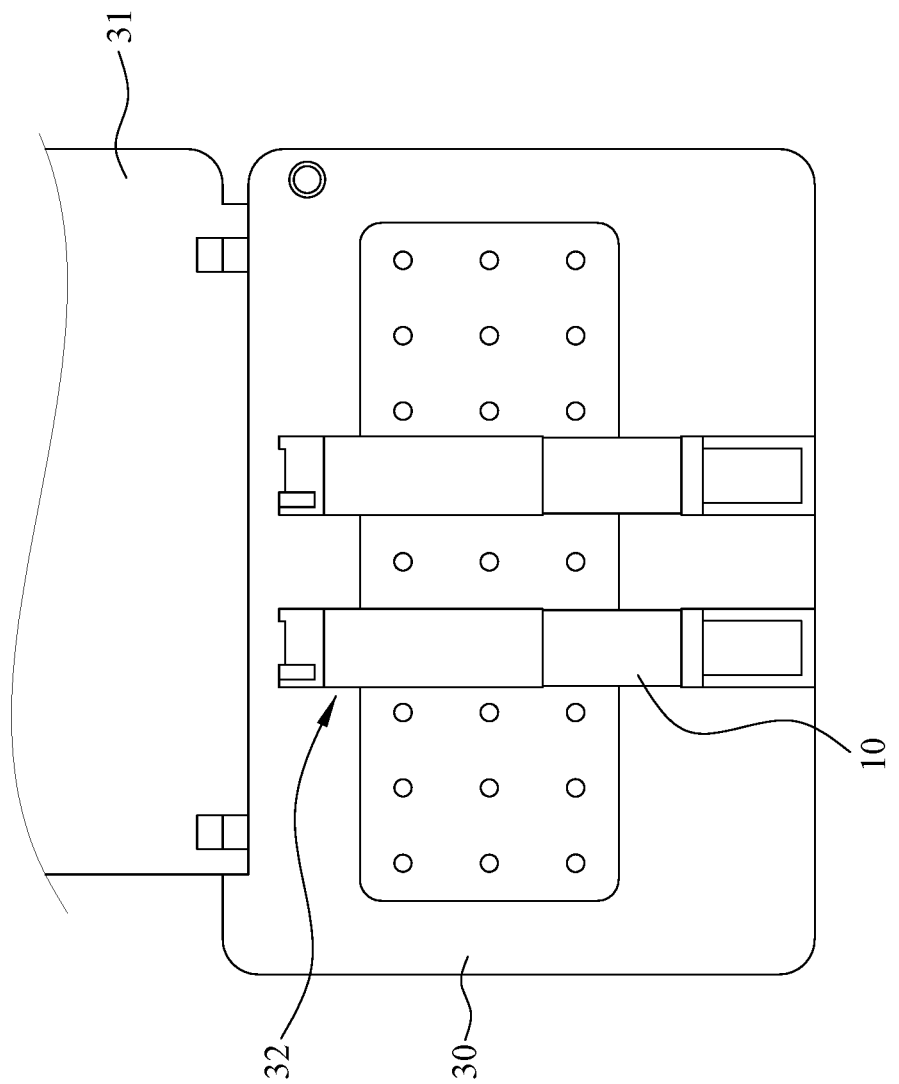
FIG. 4 shows the schematic view of the connector set in the laser jig.
Figure 5:
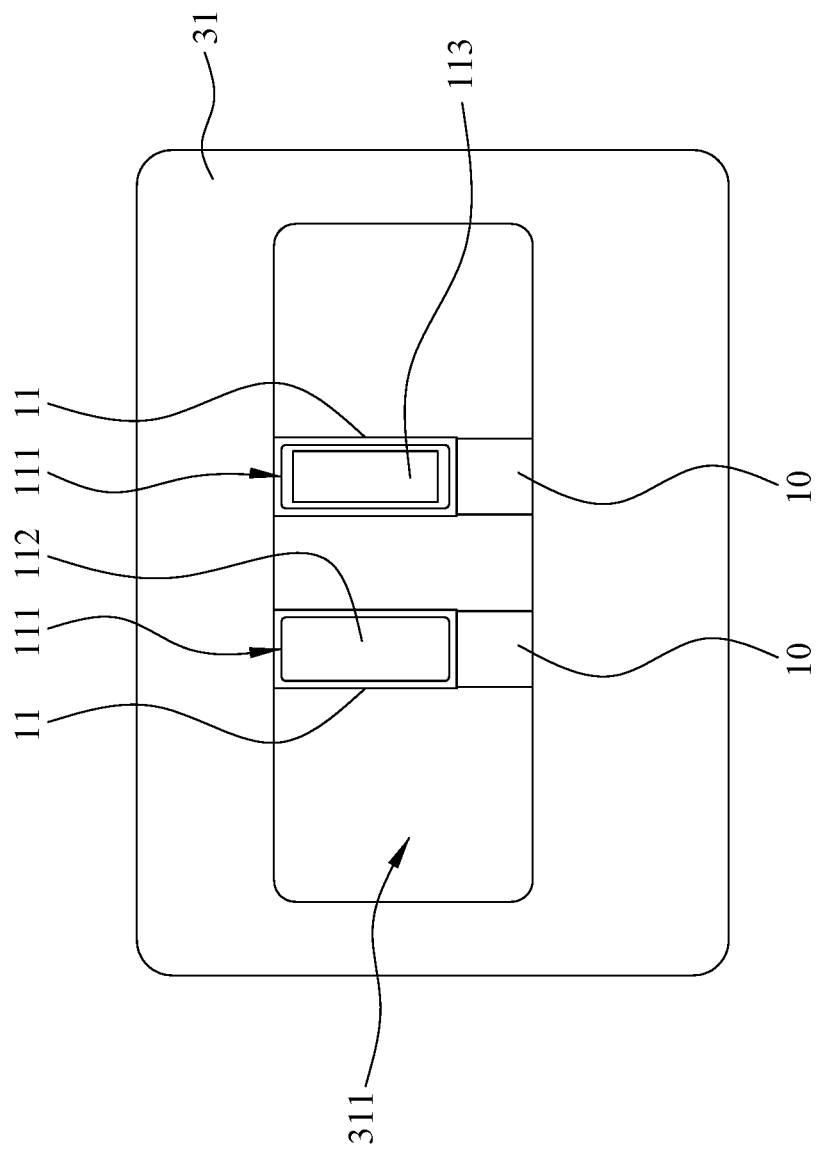
FIG. 5 shows a schematic view of the cover of the laser jig.
Figure 6:
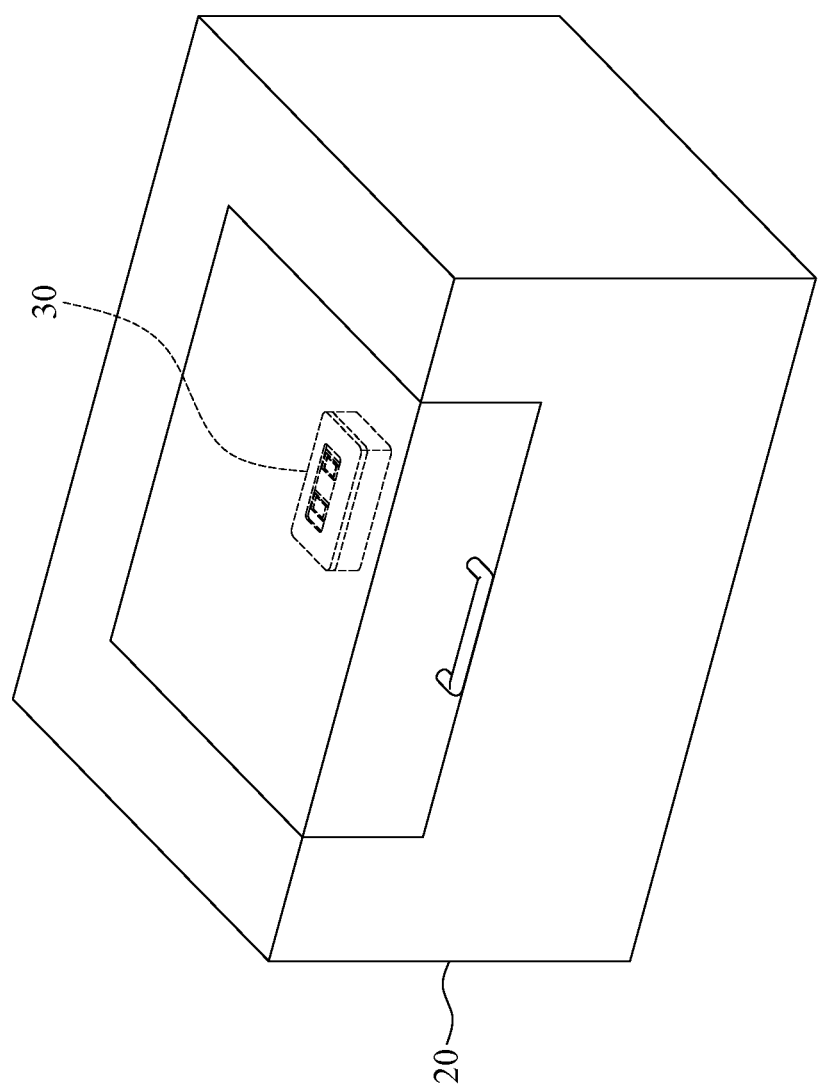
FIG. 6 shows a schematic view of the laser jig set in the laser engraving device.
Figure 11:
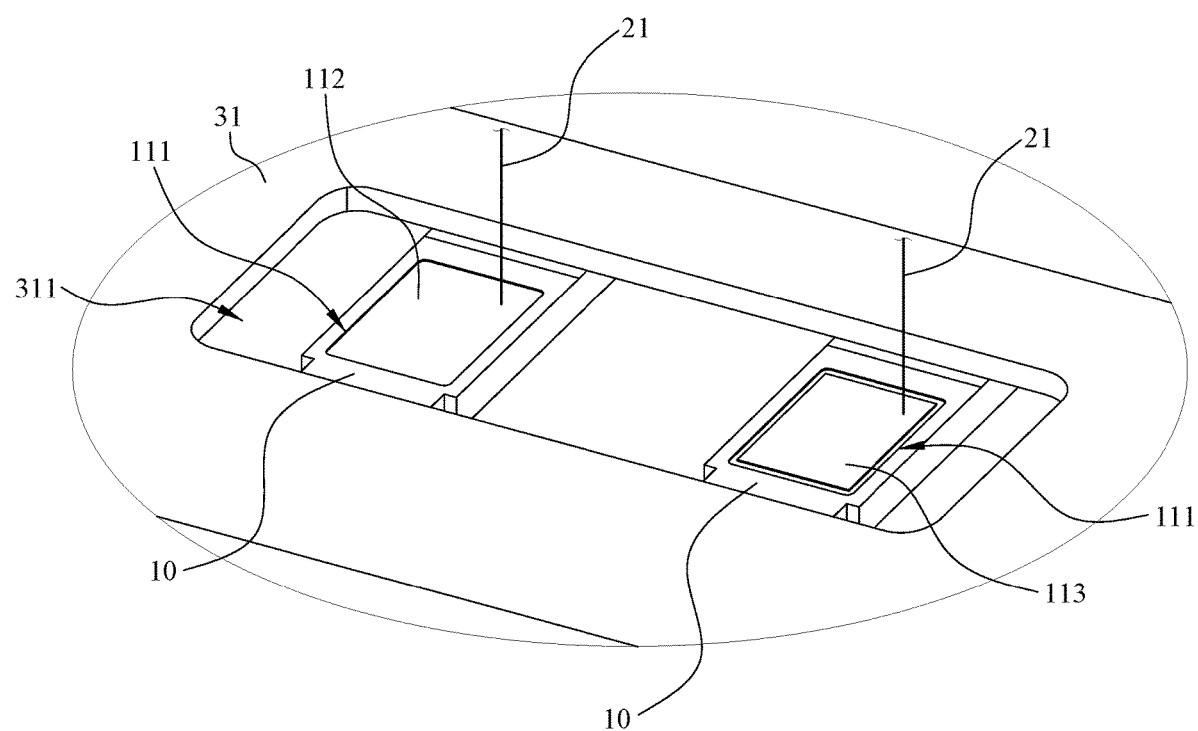
FIG. 11 shows a schematic view of the laser beam engraving the label on the labeling part.

FIG. 2 is a flowchart of step S100 of the label forming method of the connector of the present invention, FIG. 3 shows a schematic view of inspecting the appearance of the connector 10, FIG. 4 shows a schematic view of the connector 10 set on the laser jig 30, FIG. 5 shows a schematic view of the cover 31 of the laser jig 30 being covered, and FIG. 6 shows a schematic view of the laser jig 30 set in the laser engraving device 20. Step S100 further includes the following steps: Step S110, as shown in FIGS. 2 and 3, inspecting whether the appearance of the connector 10 meets the standard; Step S120, as shown in FIGS. 2 and 4, when the appearance of the connector 10 meets the standard, lifting a cover 31 of a laser jig 30, and setting the connector 10 in a positioning groove 32 of the laser jig 30; step S130, as shown in FIGS. 2 and 5, placing the cover 31 of the laser jig 30 to fix the connector 10, and the labeling part 111 is exposed through a hollow part 311 of the cover 31; and, in step S140, as shown in FIGS. 2 and 6, the laser jig 30 is set in the laser engraving device 20. As shown in FIG. 11, the hollow part 311 of the cover 31 is rectangular-shaped to fully expose the labeling part 111 and pass the laser beam 21 while the label is engraved.

More specifically, in step S110, as shown in FIGS. 2 and 3, the user holds the connector 10 and visually inspects the surface of the connector 10 for scratches, damage, or color difference. If the surface of the connector 10 is scratched, damaged, or show color difference, the appearance of the connector 10 does not meet the standard, and the connector 10 is deemed a defective product. If there is no scratch, damage or color difference on the surface of the connector 10, the appearance of the connector 10 conforms to the standard, and the connector 10 is a good product.

Figure 7:
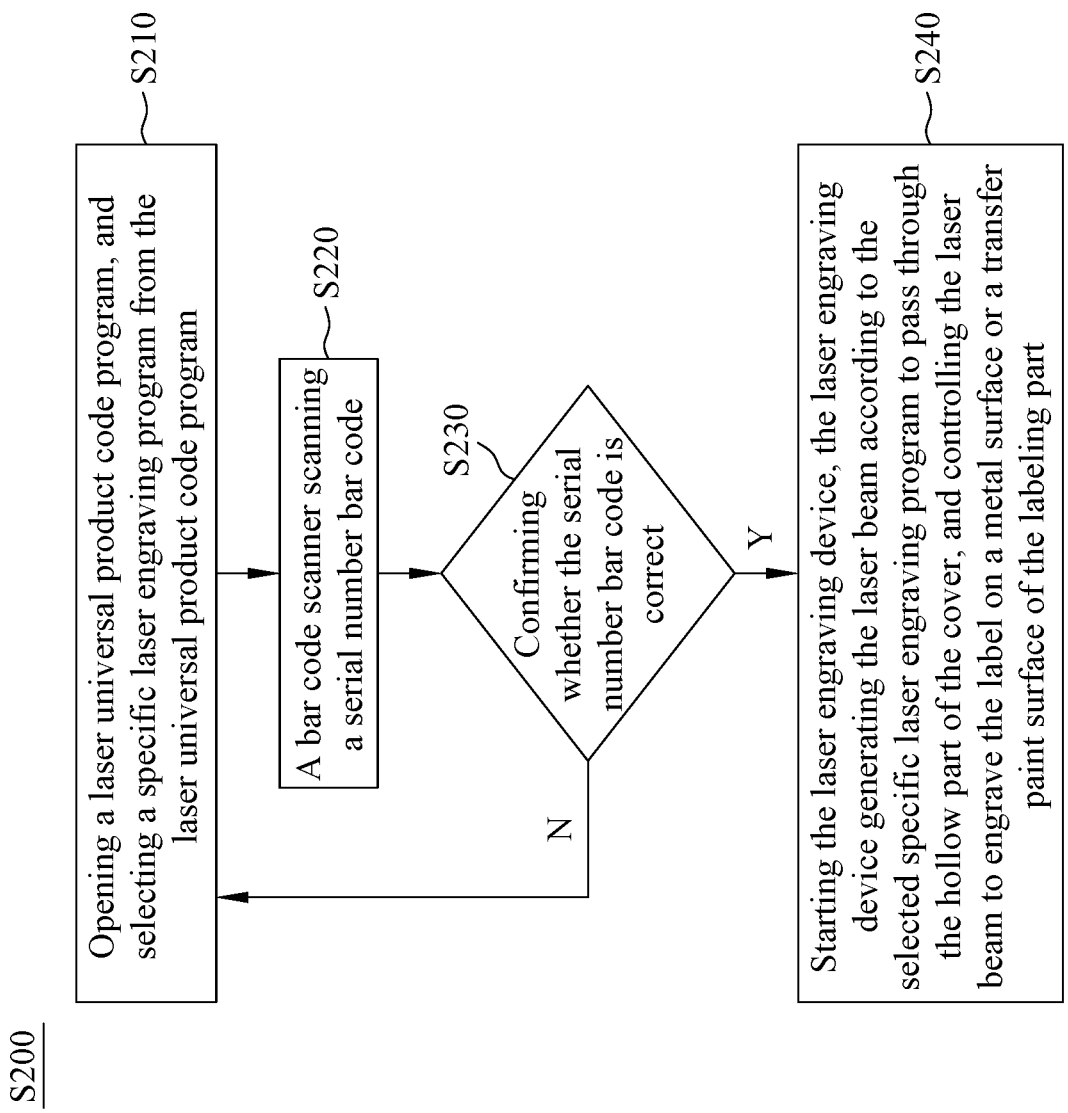
FIG. 7 is a flowchart of step S200 of the label forming method of the connector of the present invention.
Figure 8:
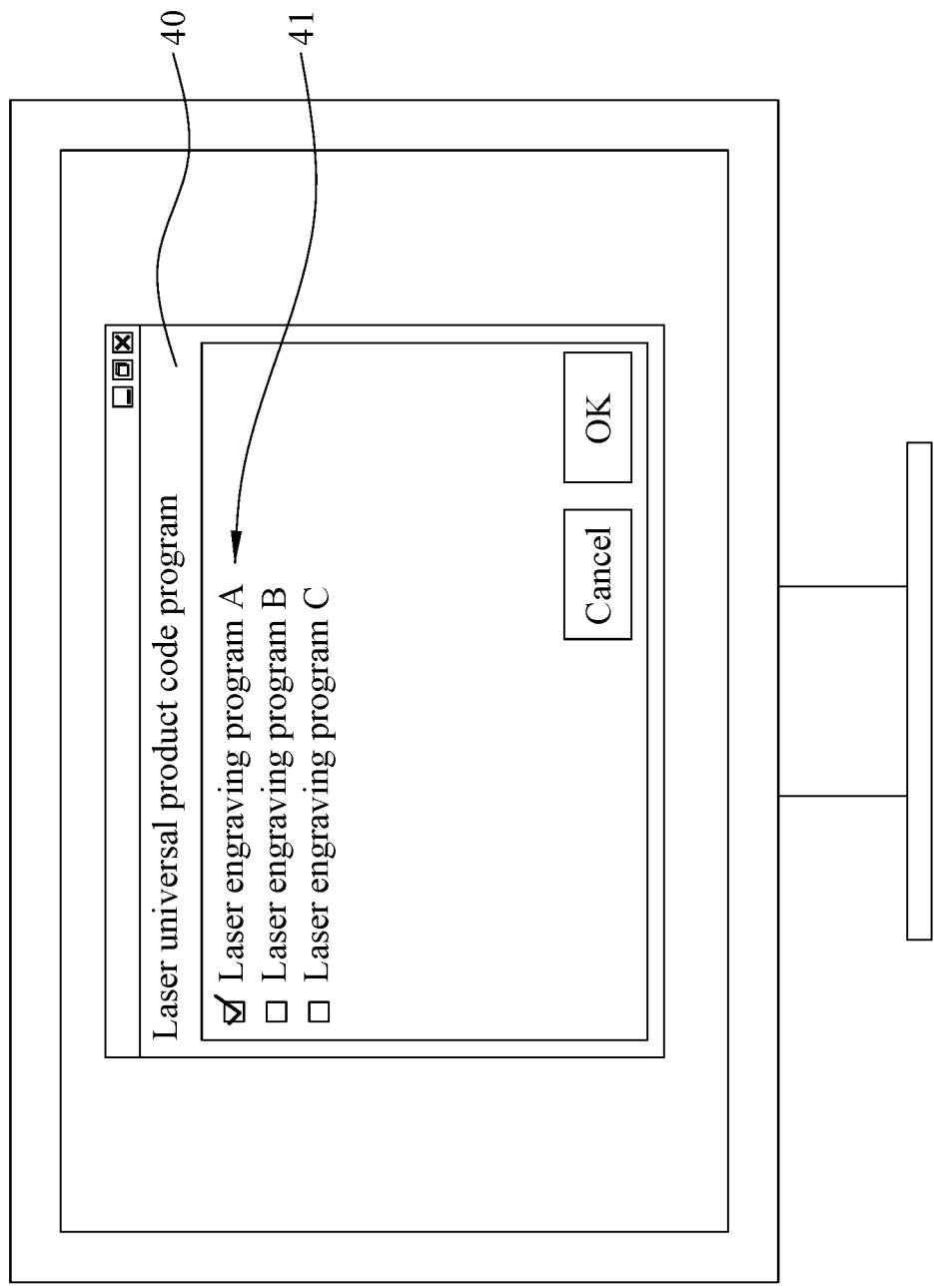
FIG. 8 shows a schematic view of selecting a specific laser engraving program from the laser general product code program.
Figure 9:
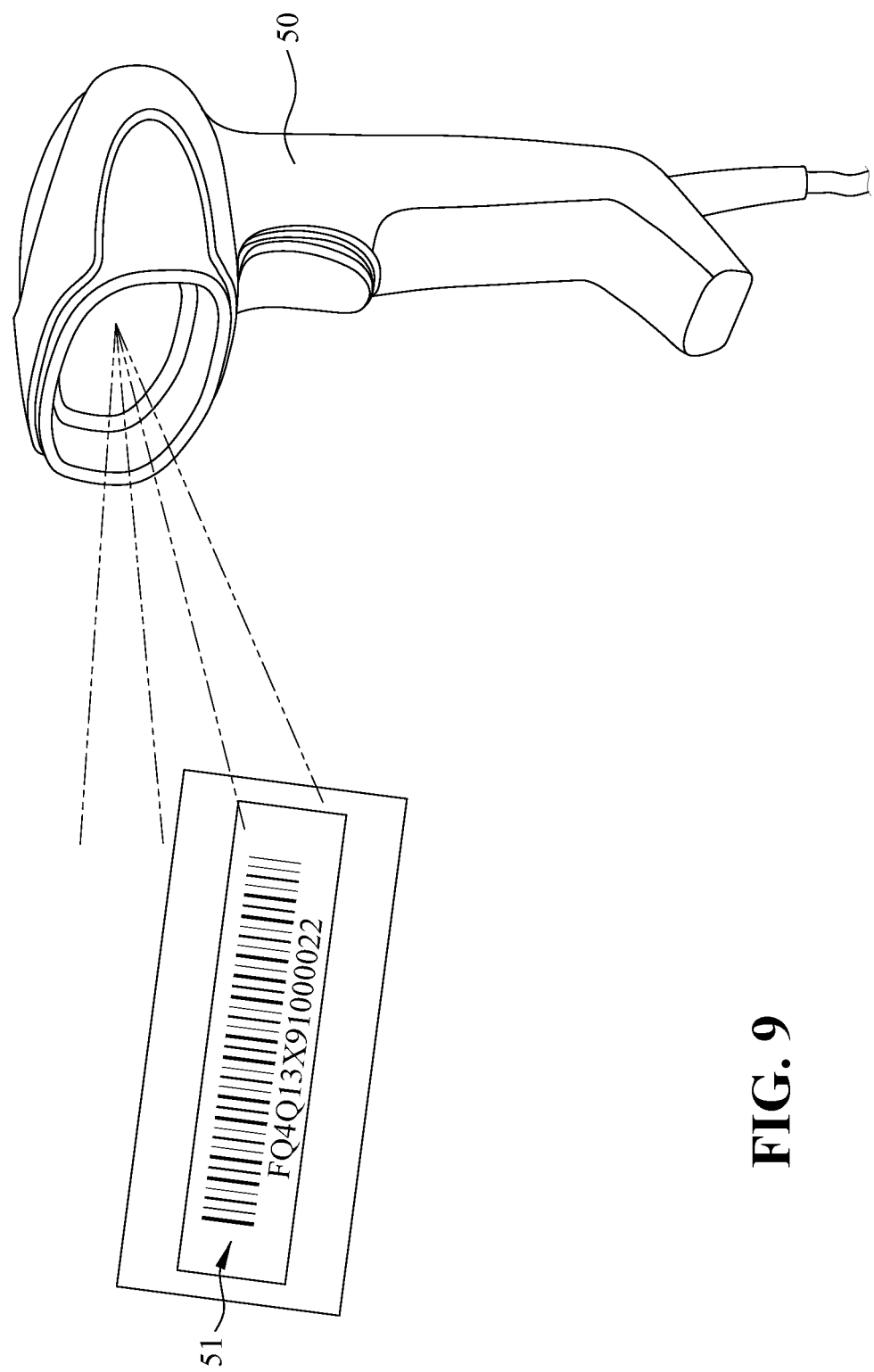
FIG. 9 shows a schematic view of the barcode scanner scanning the serial number barcode.
Figure 10:
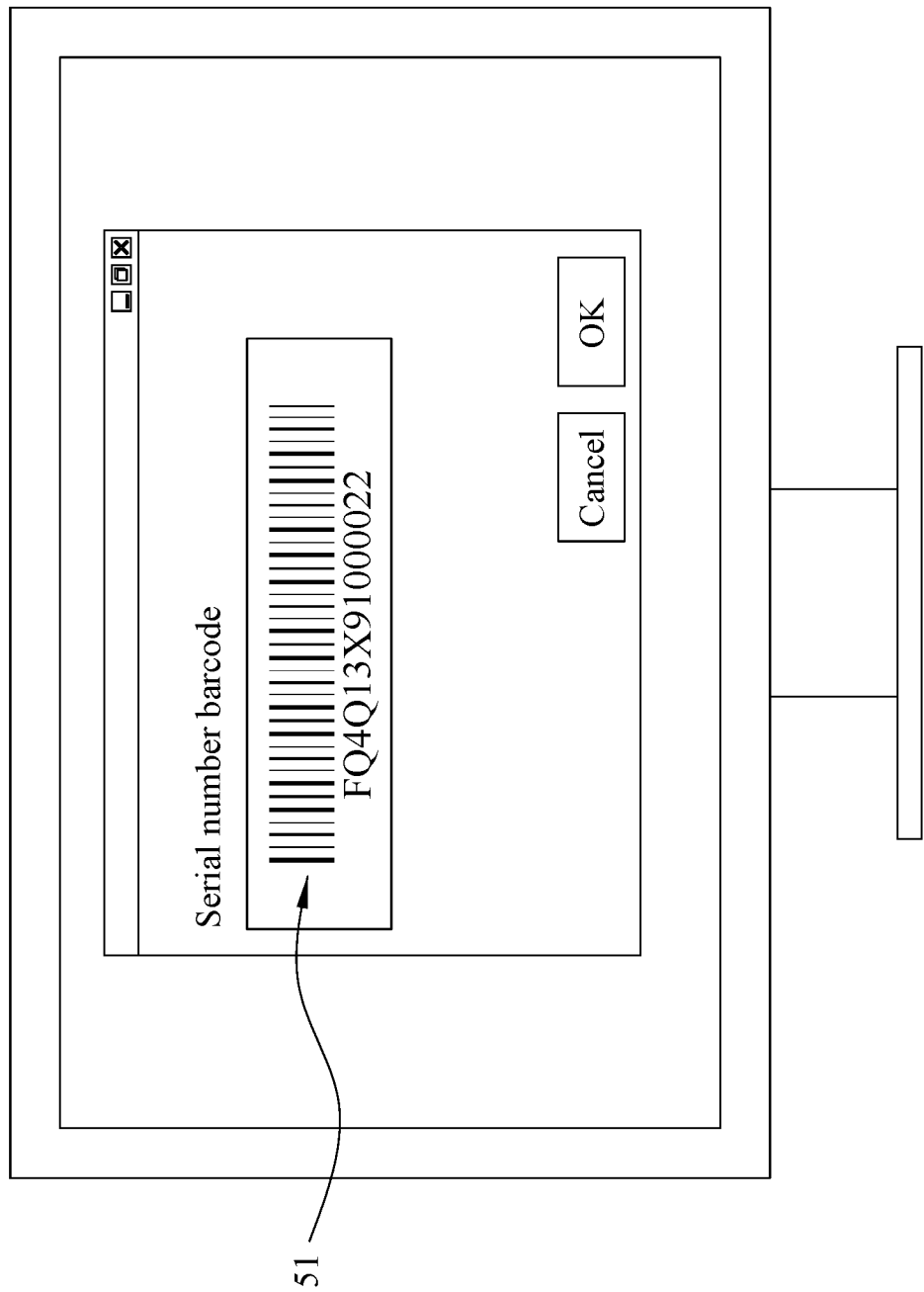
FIG. 10 shows a schematic view of confirming whether the serial number barcode is correct.

FIG. 7 is a flowchart of step S200 of the label forming method of the connector of the present invention, FIG. 8 shows a schematic view of selecting a specific laser engraving program 41 from a laser general product code program 40, FIG. 9 shows a schematic view of a barcode scanner scanning the serial number barcode, FIG. 10 shows a schematic view of confirming whether the serial number barcode is correct, and FIG. 11 shows a schematic view of the laser beam engraving the label on the labeling part. Step S200 further includes the following steps: Step S210, as shown in FIGS. 7 and 8, opening a laser universal product code program 40, and selecting a specific laser engraving program 41 from the laser universal product code program 40; Step S220, as shown in FIGS. 7 and 9, a bar code scanner 50 scanning a serial number bar code 51; step S230, as shown in FIGS. 7 and 10, confirming whether the serial number bar code 51 is correct; step S240, as shown in FIGS. 7 and 11, after confirming the serial number bar code 51 is correct, starting the laser engraving device 20. The laser engraving device 20 generates the laser beam 21 according to the selected specific laser engraving program 41 to pass through the hollow part 311 of the cover 31, and controls the laser beam 21 to engrave the label 12 on a metal surface 112 or a transfer paint surface 113 of the labeling part 111.

Figure 12:
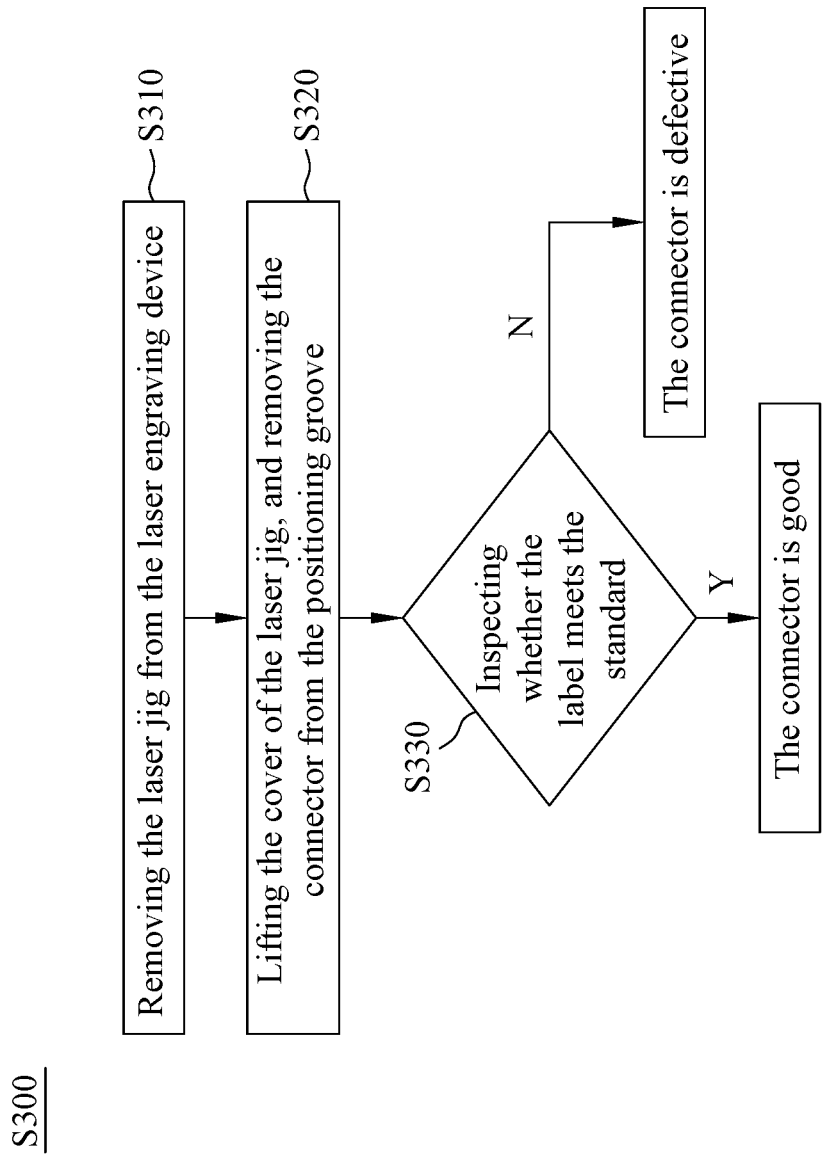
FIG. 12 is a flowchart of step S300 of the label forming method of the connector of the present invention.
Figure 13:
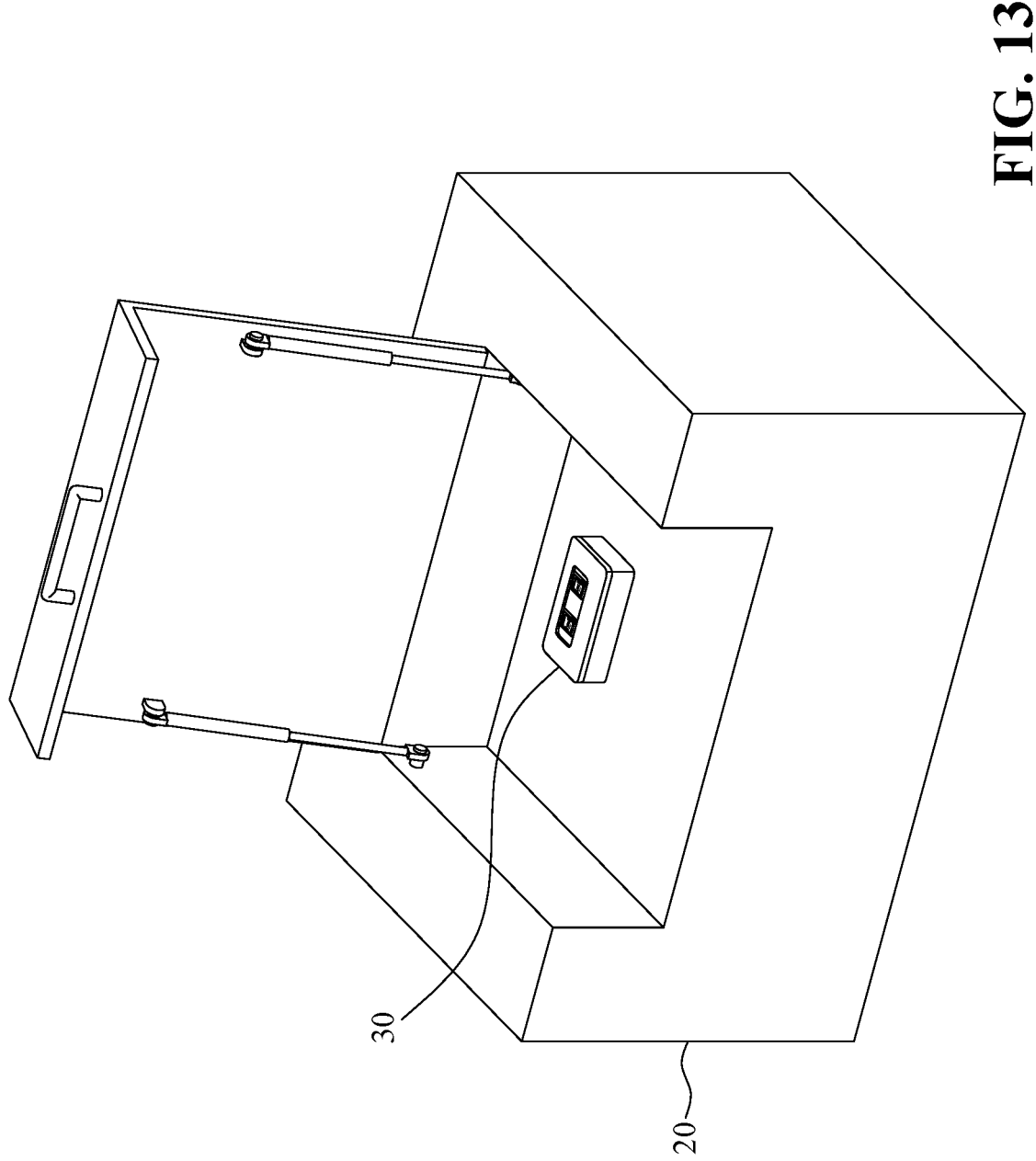
FIG. 13 shows a schematic view of removing the laser jig from the laser engraving device.
Figure 14:
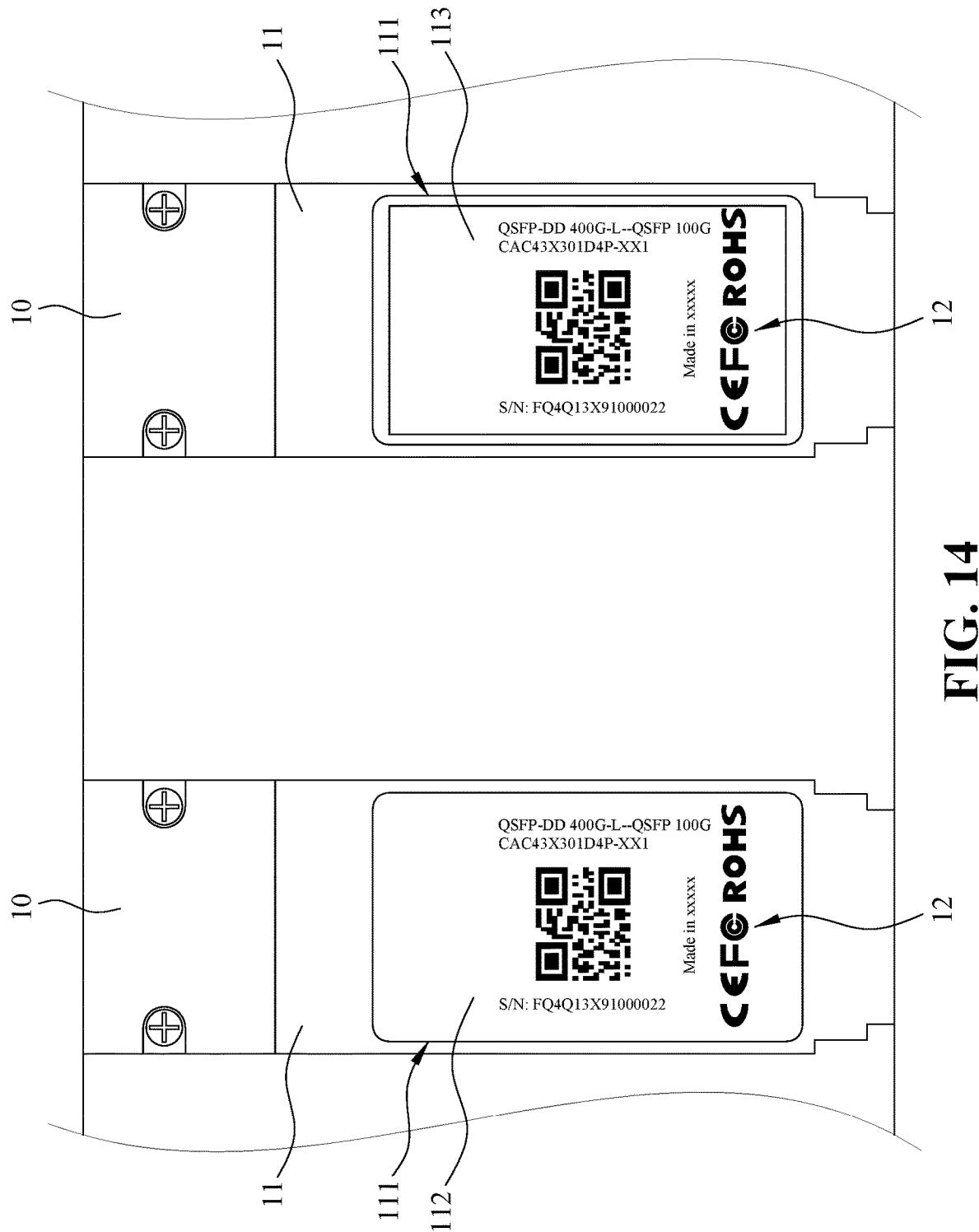
FIG. 14 shows a schematic view of removing the connector from the laser jig.
Figure 15:
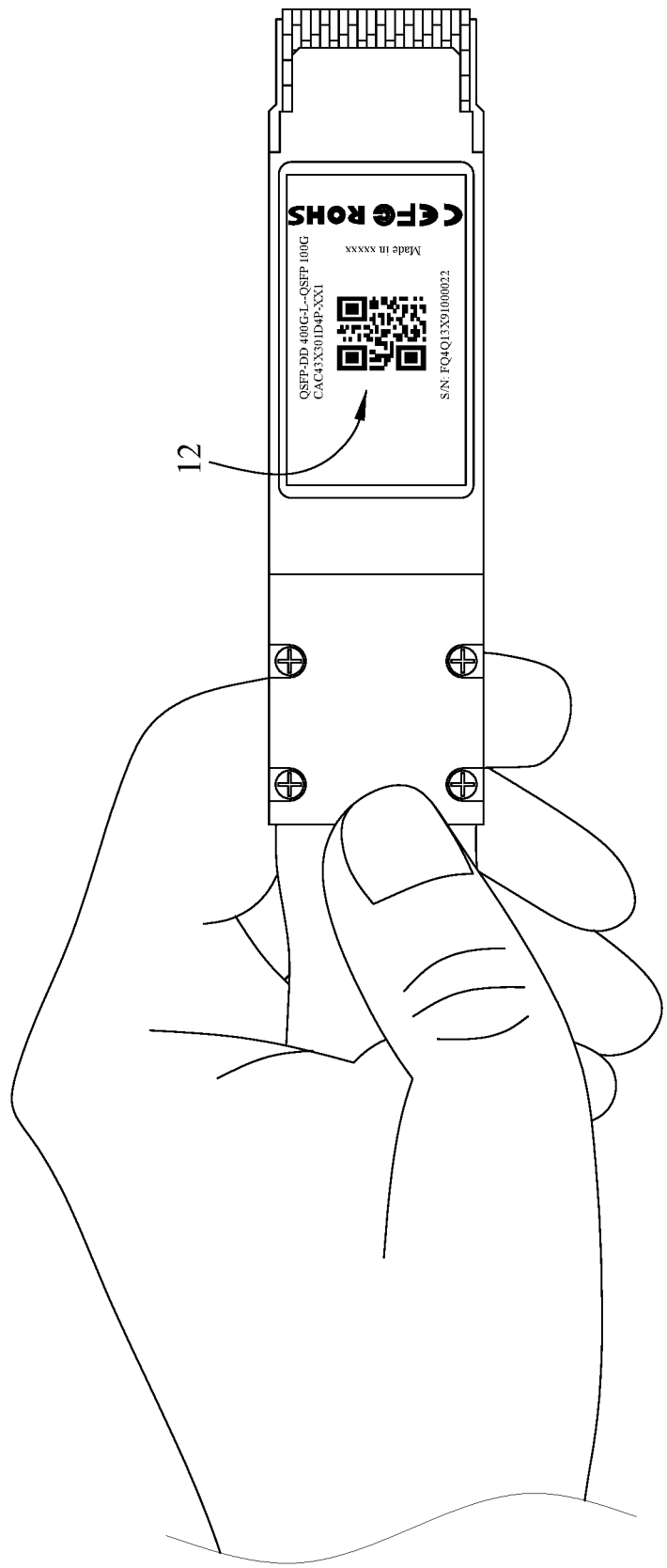
FIG. 15 shows a schematic view of inspecting the label.

FIG. 12 is a flowchart of step S300 of the label forming method of the connector of the present invention, FIG. 13 shows a schematic view of removing the laser jig 30 from the laser engraving device 20, FIG. 14 shows a schematic view of removing the connector 10 from the laser jig 30, and FIG. 15 shows a schematic view of inspecting the label 12. Step S300 further includes the following steps: Step S310, as shown in FIGS. 12 and 13, removing the laser jig 30 from the laser engraving device 20; Step S320, as shown in FIGS. 12 and 14, lifting the cover 31 of the laser jig 30, and removing the connector 10 from the positioning groove 32; and, in step S330, as shown in FIGS. 12 and 15, inspecting whether the label 12 meets the standard.

Specifically, as shown in FIG. 14, the label 12 is the text and pattern of the related product information of the connector 10, including trademark, product name, model number, serial number, two-dimensional code, place of origin, manufacturing year, manufacturing number, safety certification, etc. In step S330, as shown in FIGS. 12 and 15, the user holds the connector 10 and visually inspects whether the text and pattern of the label 12 are complete. If the text and pattern of the label 12 are blurred or missing, the label 12 does not meet the standard, and the connector 10 is deemed a defective product. If the text and pattern of the label 12 are clear and complete, the label 12 conforms to the standard, and the connector 10 is a good product.

Preferably, the connector 10 is a small form-factor pluggable (SFP) transceiver, a quad small form-factor pluggable (QSFP) transceiver or an octal small package pluggable (OSFP) transceiver.

Figure 16:
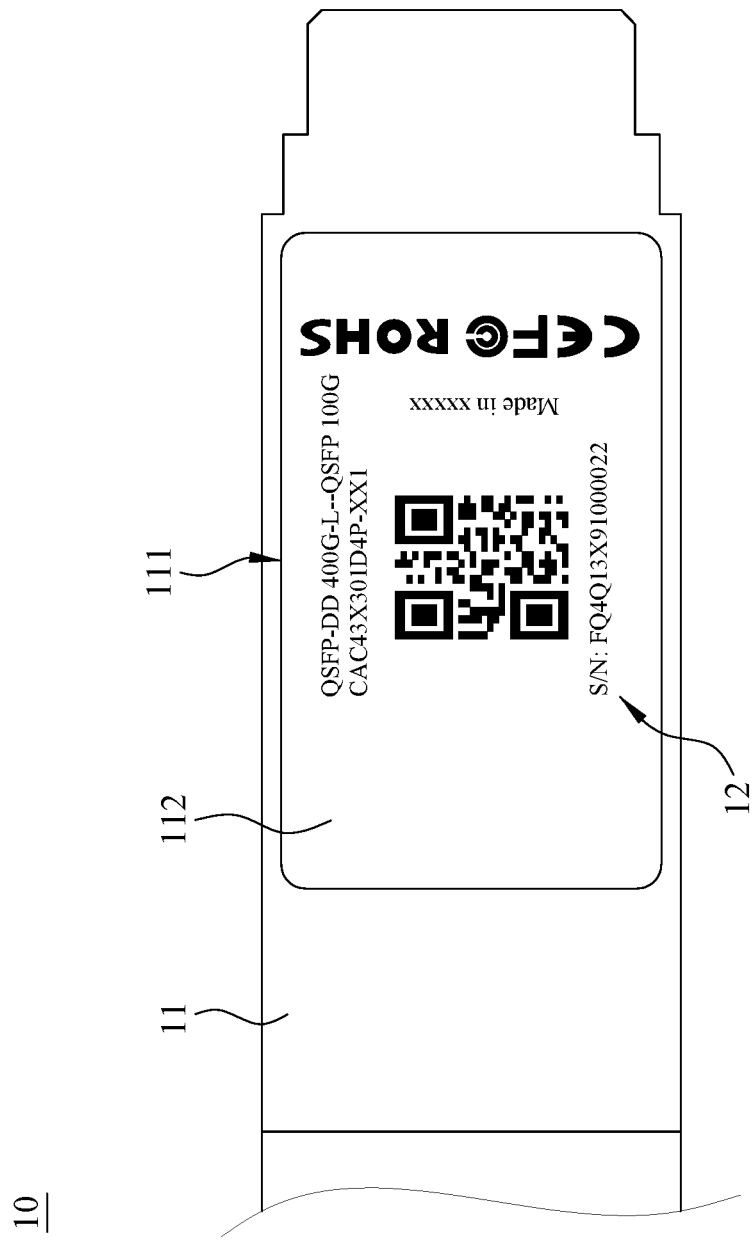
FIG. 16 is a schematic view of the first embodiment of the connector of the present invention.

FIG. 16 is a schematic view of the first embodiment of the connector of the present invention. As shown in FIG. 16, the present invention provides a connector 10 including a metal shell 11 and a label 12. The metal shell 11 has a labeling part 111, and the labeling part 111 has a metal surface 112. The label 12 is engraved on the metal surface 112 of the labeling part 111 by a laser beam 21.

Figure 17:
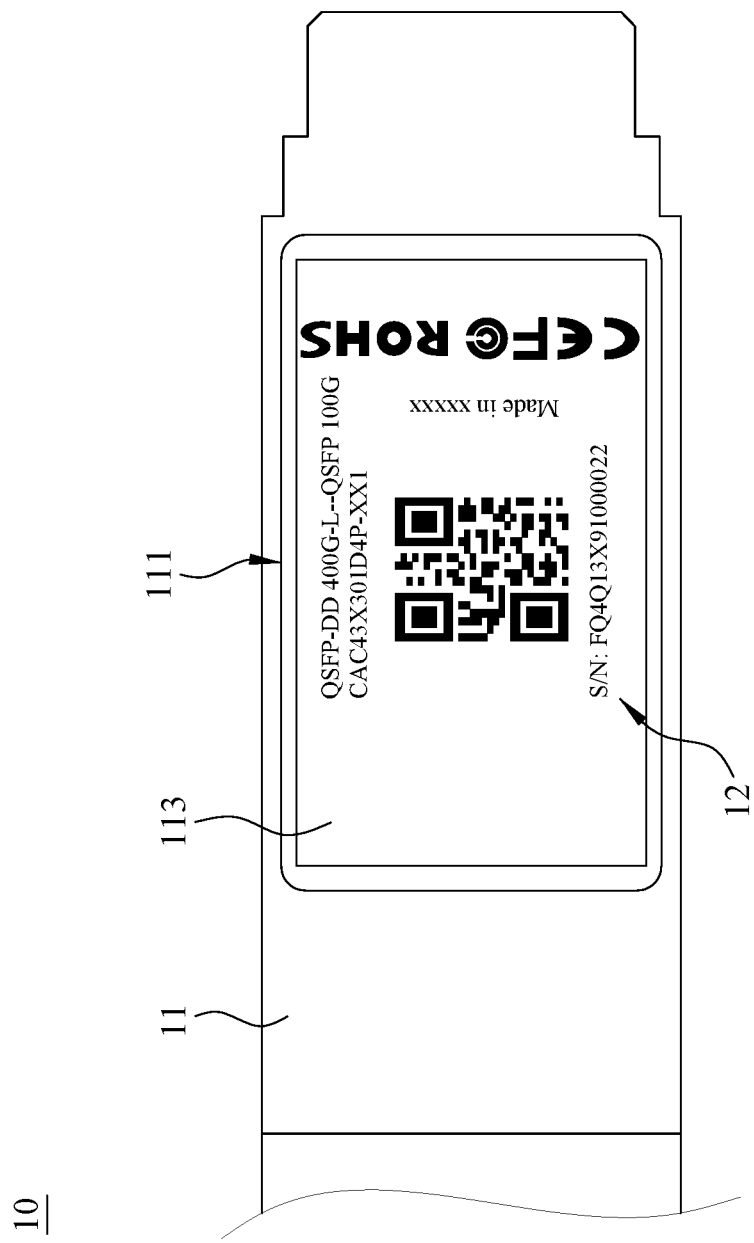
FIG. 17 is a schematic view of the second embodiment of the connector of the present invention.

FIG. 17 is a schematic view of the second embodiment of the connector of the present invention. As shown in FIG. 17, the present invention provides a connector 10 including a metal shell 11 and a label 12. The metal shell 11 has a labeling part 111, and the labeling part 111 has a transfer paint surface 113. The label 12 is engraved on the transfer paint surface 113 of the labeling part 111 by a laser beam 21.

In summary, the present invention can use laser engraving technology to engrave the label 12 on the labeling part 111 of the metal shell 11 of the connector 10, instead of the traditional self-adhesive label 12, so as to achieve the following multifold effects:

First of all, the label 12 will not fall off, no matter how much rubbed, the label 12 will not be dirty and fuzzy; therefore, it is easy to identify, and the barcode scanner can scan the serial number barcode.

Furthermore, the label 12 has no ink and will not cause allergic reactions in the human.

In addition, the label 12 has no adhesive and will not have any problems caused by the adhesive.

In addition, laser engraving technology has the advantages of wide engraving range, fast engraving speed, high engraving quality, low engraving energy consumption, high processing efficiency and high processing accuracy. Therefore, the laser engraving technology can engrave the texts and patterns of the label 12 within a small area, with high precision and high complexity. The present invention can be applied to the label 12 of the connector 10 that needs to produce a large number and rapid formation of various texts and patterns. In addition, the labeling part 111 does not generate carbonized black edges and can maintain its original color.

It is worth mentioning that the label 12 does not exceed the boundary of the labeling part 111. Therefore, during the process of plugging and unplugging the connector 10, the label 12 will not touch a conductive shrapnel for electromagnetic interference (EMI) prevention of a socket of a server, so that the conductive shrapnel will not be damaged. Moreover, in the process of unplugging the connector 10, the label 12 will not touch the socket of the server, and the label 12 will not make the connector 10 stuck in the socket of the server, so that the connector 10 can be easily removed from the socket of the server.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A laser engraving label forming method of a connector, comprising the steps of:
preparing a laser engraving device and a laser jig having a cover, the cover having a hollow part;
inspecting the connector and ensuring that the connector has appearance meeting a connector standard;
lifting the cover and setting the connector in a positioning groove of the laser jig;
covering the laser jig with the cover and exposing a labeling part of a metal shell of the connector through the hollow part;
placing the laser jig in the laser engraving device;
using the laser engraving device to generate a laser beam and control the laser beam through the hollow part to engrave a label on the labeling part;
removing the laser jig from the laser engraving device;
lifting the cover to remove the connector from the positioning groove; and
inspecting if the label conforms to a label standard;
wherein the hollow part is rectangular-shaped to fully expose the labeling part and pass the laser beam while the label is engraved.

2. The laser engraving label forming method of a connector according to claim 1, wherein the step of using the laser engraving device to generate a laser beam and control the laser beam through the hollow part to engrave a label on the labeling part further includes the following steps: opening a laser universal product code program, and selecting a specific laser engraving program from the laser universal product code program; scanning a serial number barcode with a code scanner; confirming whether the serial number barcode is correct; after confirming that the serial number barcode is correct, starting the laser engraving device; the laser engraving device generating the laser beam according to the selected specific laser engraving program, and controlling the laser beam to engrave the label on the labeling part.

3. The laser engraving label forming method of a connector according to claim 1, wherein in the step of using the laser engraving device to generate a laser beam and control the laser beam through the hollow part to engrave a label on the labeling part, the label is engraved on a metal surface or a transfer paint surface of the labeling part.

4. The laser engraving label forming method of a connector according to claim 1, wherein the connector is a small form-factor pluggable transceiver, a quad small form-factor pluggable transceiver, or an octal small form-factor pluggable transceiver.

* * * * *